United States Patent
Ferguson et al.

(10) Patent No.: US 6,241,326 B1
(45) Date of Patent: Jun. 5, 2001

(54) ELECTRONIC BRAKE PROPORTIONING FOR A REAR WHEEL ANTI-LOCK BRAKE SYSTEM

(75) Inventors: Steven C. Ferguson, Orion; Darren G. Graczyk, Canton, both of MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/426,444

(22) Filed: Oct. 25, 1999

Related U.S. Application Data
(60) Provisional application No. 60/105,910, filed on Oct. 28, 1998.

(51) Int. Cl.[7] ................................................. B60T 8/74
(52) U.S. Cl. ........................ 303/177; 303/116.2; 303/175
(58) Field of Search ............................ 303/116.1, 116.2, 303/177, 175

(56) References Cited

U.S. PATENT DOCUMENTS

| | | |
|---|---|---|
| 3,937,523 | 2/1976 | Ayers, Jr. et al. . |
| 4,556,261 * | 12/1985 | Farr .................................. 303/115.6 |
| 4,668,023 * | 5/1987 | Every et al. ...................... 303/119.2 |
| 4,673,226 * | 6/1987 | Every et al. ......................... 303/149 |
| 4,699,436 | 10/1987 | Klein . |
| 4,790,607 * | 12/1988 | Atkins .................................. 303/195 |
| 4,824,181 * | 4/1989 | Tomala ................................ 303/84.2 |
| 4,828,335 * | 5/1989 | Fuller et al. ......................... 303/160 |
| 4,976,501 * | 12/1990 | Sivulka et al. ..................... 303/113.5 |
| 5,382,086 * | 1/1995 | Tuck et al. ............................ 303/156 |
| 5,390,987 | 2/1995 | Willi et al. . |
| 5,454,630 * | 10/1995 | Zhang .................................. 303/175 |
| 5,487,594 * | 1/1996 | Schneider ............................. 303/155 |
| 5,522,650 * | 6/1996 | Negrin et al. .......................... 303/10 |
| 5,567,022 * | 10/1996 | Linkner ................................. 303/87 |
| 5,599,075 * | 2/1997 | Hara et al. ........................... 303/143 |
| 5,620,240 * | 4/1997 | Tuck et al. ............................ 303/156 |
| 5,632,535 * | 5/1997 | Luckevich et al. ................... 303/186 |
| 5,941,612 * | 8/1999 | Carpenter ............................. 303/122 |

FOREIGN PATENT DOCUMENTS 2 136 519 B    1/1987    (GB) .
2 135 413 B    2/1987    (GB) .

* cited by examiner

Primary Examiner—Robert J Oberleitner
Assistant Examiner—Devon Kramer
(74) Attorney, Agent, or Firm—MacMillan, Sobanski & Todd, LLC

(57) ABSTRACT

The control algorithm for a rear wheel anti-lock brake system includes a subroutine which proportions the applied braking force between front and rear wheel brakes of a vehicle during a braking cycle. The speed of the rear wheels is sensed and used to calculate an estimated vehicle deceleraion. Upon the estimated vehicle deceleration exceeding a deceleration threshold, an isolation valve is closed to hold the brake pressure applied to the vehicle rear brakes constant. Upon further increases of the estimated vehicle deceleration, the isolation valve is selectively opened to increase the rear brake pressure in proportion to the front brake pressure.

17 Claims, 12 Drawing Sheets

ELECTRONIC BRAKE PROPORTIONING FOR A REAR WHEEL ANTI-LOCK BRAKE SYSTEM

CROSS REFERENCE TO RELATED APPLICATIONS

This application claims the benefit of U.S. Provisional Application No. 60/105,910, filed Oct. 28, 1998.

BACKGROUND OF THE INVENTION

This invention relates in general to vehicle anti-lock brake systems and in particular to a rear wheel anti-lock brake system which includes electronic brake proportioning.

Non-commercial vehicles are typically equipped with a hydraulic brake system having a master cylinder which is connected to wheel cylinders mounted adjacent to each of the vehicle wheels. The master cylinder is connected by a mechanical linkage to the vehicle brake pedal and the wheel cylinders are mechanically connected to the wheel brakes. When the vehicle operator depresses the brake pedal, the master cylinder applies hydraulic pressure to the wheel cylinders which, in turn, actuate the wheel brakes.

Typically, the vehicle brake system also includes a hydraulic proportioning valve connected between the master cylinder and the rear wheel cylinders to provide a balance between front and rear brake forces during a brake cycle to ensure adequate vehicle stability. Such brake force proportioning is designed so that, in the majority of braking cases, the front wheels will lock up before the rear wheels. This is because the locking of the rear wheels brings about a high risk of skidding while locking of the front wheels decreases steerability. Accordingly, the hydraulic proportioning valve controls the rear brake pressure with a fixed proportionality to the front brake pressure.

An anti-lock brake system (ABS) is often included as standard equipment on new vehicles. When actuated, the ABS is operative to control the operation of some or all of the vehicle wheel brakes. A typical ABS, which controls all four vehicle wheels, includes a plurality of normally open and normally closed solenoid valves which are mounted within a control valve body and connected to the vehicle hydraulic brake system. A separate hydraulic source, such as a motor driven pump, is included in the ABS for reapplying hydraulic pressure to the controlled wheel brakes during an ABS braking cycle. The pump is typically included within the control valve body while the pump motor is mounted upon the exterior of the control valve body.

It is also known to provide an ABS for the rear wheels only. Such a system is commonly referred to as a Rear Wheel Anti-Lock brake system (RWAL). Typically, RWAL does not include a motor driver pump, but utilizes the vehicle master brake cylinder as a source of pressurized brake fluid. While a RWAL has a limited volume of pressurized brake fluid available during an ABS brake cycle, elimination of the pump and pump motor simplifies the system and reduces the cost of the system.

Both four wheel ABS and RWAL include an electronic control module which has a microprocessor. The control module is electrically coupled to the pump motor, in a four wheel ABS, a plurality of solenoid coils associated with the solenoid valves and one or more wheel speed sensors for monitoring the speed and deceleration of the controlled wheels. A four wheel ABS typically includes a wheel speed sensor for both of the front vehicle wheels and a single wheel speed sensor for the rear wheels. Because only the rear wheels are controlled in a RWAL, only one wheel speed sensor is needed to monitor the rear wheel speed. This further reduces the cost of a RWAL in comparison to an ABS. The control module is typically mounted upon the control valve body to form a compact unit which is often referred to as an ABS electro-hydraulic control unit.

During vehicle operation, the microprocessor in the ABS control module continuously receives speed signals from the wheel speed sensors. The microprocessor monitors the speed signals for potential wheel lock-up conditions. When the vehicle brakes are applied and the microprocessor senses an impending wheel lock-up condition, the microprocessor is operative to actuate the pump motor, in a four wheel ABS, and selectively operate the solenoid valves in the control unit to cyclically relieve and reapply hydraulic pressure to the controlled wheel brakes. The hydraulic pressure applied to the controlled wheel brakes is adjusted by the operation of the solenoid valves to limit wheel slippage to a safe level while continuing to produce adequate brake torque to decelerate the vehicle as desired by the driver.

The brake proportioning function described above has been integrated into four wheel ABS, as described in U.S. Pat. No. 5,632,535, which issued on May 27, 1997. The brake proportioning described in the patent utilizes the wheel speeds measured by the front and rear wheel speed sensors to dynamically control the rear brake force with the solenoid valves included in the ABS for controlling the rear wheel brakes. The resulting electronic brake proportioning function is included in the four wheel ABS by a modification of the ABS control algorithm. Since the sensors and solenoid valves are already included in the ABS, electronic rear brake proportioning can be provided by the four wheel ABS without additional hardware. Accordingly, the hydraulic proportioning valve can be eliminated, which provides a cost saving.

SUMMARY OF THE INVENTION

This invention relates to a rear wheel anti-lock brake system which includes electronic brake proportioning.

As described above, electronic brake proportioning can be included in a four wheel ABS by a modification of the ABS control algorithm. Electronic brake proportioning provides a cost savings by eliminating the hydraulic proportioning valve. Accordingly, it would be desirable to also include electronic brake proportioning in a RWAL.

The present invention contemplates a system for controlling a rear wheel brake of a vehicle. The system includes a master cylinder operable by a vehicle operator to supply pressurized brake fluid and at least one front wheel brake connected to the master cylinder. A normally open isolation valve having an inlet port and an outlet port has the inlet port connected to the master cylinder. At least one rear wheel brake is connected to the isolation valve outlet port. The system further includes a speed sensor which generates a signal proportional to the speed of the rear wheel associated with the rear wheel brake and a controller connected to the speed sensor and the isolation valve. The controller is responsive to the wheel speed sensor signals to calculate an estimated vehicle deceleration. The controller is operable to close the isolation valve to block further increases of the pressure applied to the rear wheel brake upon the estimated vehicle deceleration exceeding a predetermined first deceleration threshold during a braking cycle.

The invention further contemplates that, subsequent to the closure of the isolation valve, the controller continues to calculate an estimated vehicle deceleration. Upon the estimated vehicle deceleration exceeding a second vehicle deceleration threshold which is greater than the first vehicle deceleration threshold, the controller is operable to selectively open the isolation valve to allow an increase of the pressure applied to the rear wheel brake. Accordingly, the braking force is proportioned between said front and rear wheel brakes. In the preferred embodiment, the isolation valve is selectively held open for a predetermined period of time. Also, the controller calculates the second deceleration threshold by adding a predetermined increment to the first deceleration threshold.

Alternately, the controller can be responsive to the speed sensor signals to calculate an estimated rear wheel slip. Upon the estimated rear wheel slip exceeding a predetermined slip threshold during a braking cycle, the controller is operable to close the isolation valve to block further increases of the pressure applied to the rear wheel brake. The controller then continues to calculate an estimated rear wheel slip. Upon the estimated rear wheel slip falling below the predetermined slip threshold, the controller is operable to selectively open the isolation valve to allow an increase of the pressure applied to said rear wheel brake to proportion the braking force between the front and rear wheel brakes.

The invention also may include a g-sensor connected to the controller with the g-sensor generating a signal proportional to the deceleration of the vehicle. The controller is then responsive to the speed sensor and g-sensor signals to calculate an estimated rear wheel slip. Upon the estimated rear wheel slip exceeding a predetermined slip threshold during a braking cycle, the controller is operable to close the isolation valve to block further increases of the pressure applied to the rear wheel brake.

The invention also contemplates a method for proportioning the braking force between front and rear wheel brakes which includes the steps of providing a system for controlling at least one rear wheel brake. The system includes an isolation valve connected between the master cylinder and the controlled rear wheel brake. The rear wheel speed is sampled and the sampled rear wheel speed is used to estimate a vehicle deceleration. The estimated vehicle deceleration is compared to a predetermined first deceleration threshold. The isolation valve is closed during a braking cycle when the estimated deceleration is greater than the first deceleration threshold.

The method further contemplates continuing to sample the rear wheel speed and using the sampled rear wheel speed to update the estimated vehicle deceleration. The updated estimated vehicle deceleration is compared to a second deceleration threshold which is greater that the first deceleration threshold and the isolation valve is selectively opened upon the updated estimated vehicle deceleration exceeding the second deceleration threshold. The opening of the isolation valve increases the pressure applied to the controlled rear wheel brake to proportion the braking force between the front and rear wheel brakes. In the preferred embodiment, the isolation valve is held open for a predetermined time period. Additionally, after the isolation valve is closed, the second deceleration threshold is calculated by adding a predetermined increment to said first deceleration threshold.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

This invention relates to a Rear Wheel Anti-Lock Brake System which includes electronic brake proportioning.

As described above, known electronic brake proportioning systems require multiple sensors. However a RWAL typically has only one speed sensor. Thus, RWAL can not support known electronic brake proportioning systems. However, an electronic brake proportioning system which uses the RWAL hardware would provide cost savings by allowing elimination of the proportioning valve from the brake system. Accordingly, it would be desirable to include electronic brake proportioning in an RWAL system.

Figure 1:
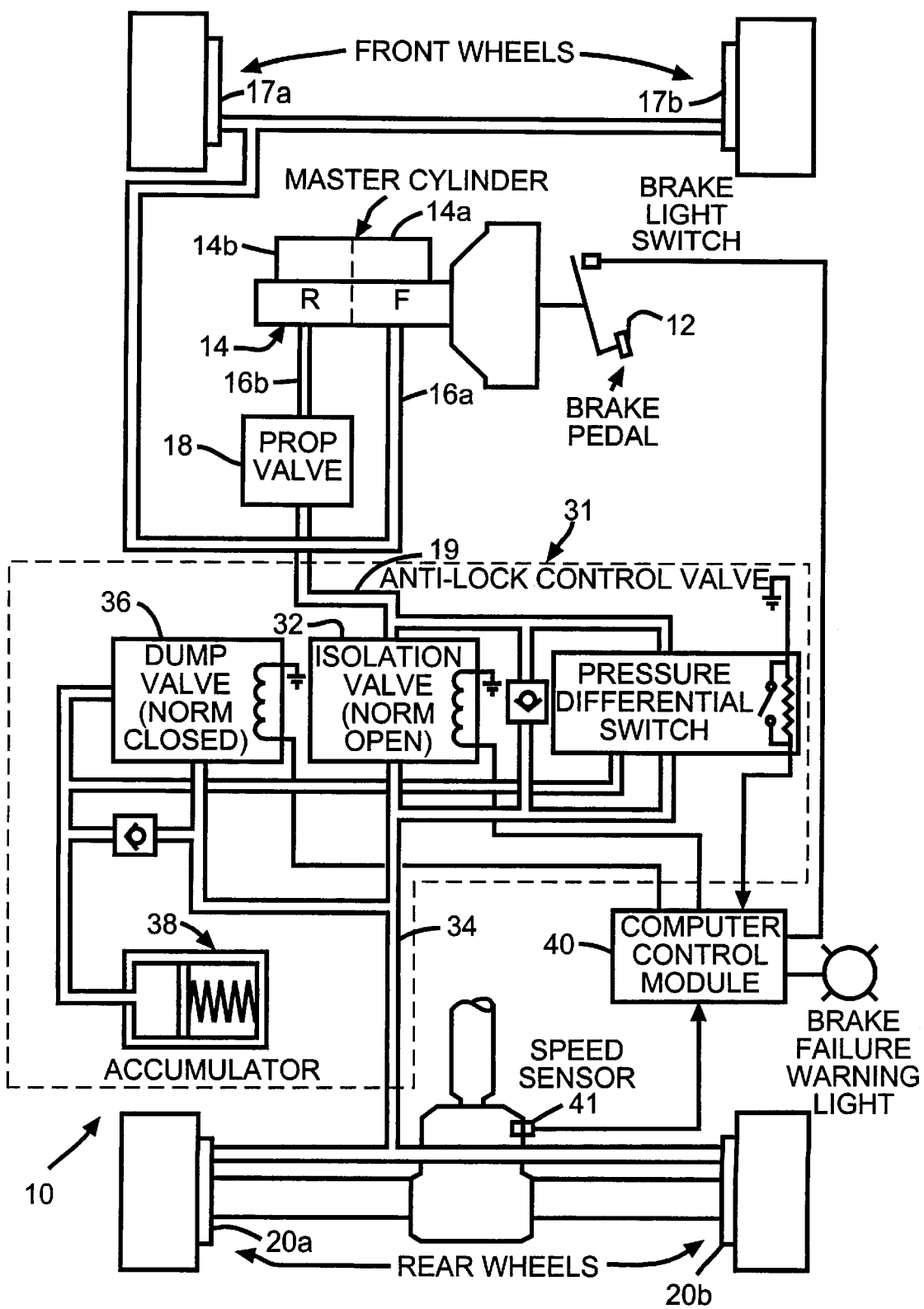
FIG. 1 is a schematic diagram of a typical rear wheel anti-lock brake system which includes a hydraulic proportioning valve.

Referring now to the drawings, there is illustrated in FIG. 1 a typical RWAL designated generally at 10. As shown in FIG. 1, the RWAL 10 is installed on a vehicle having a hydraulic braking system consisting of a brake pedal 12 coupled to operate a dual reservoir master cylinder 14. When the vehicle operator depresses the brake pedal 12, the master cylinder 14 supplies hydraulic fluid under pressure from a front reservoir 14a through a hydraulic line 16a to actuate a pair of vehicle front wheel brakes 17a and 17b. The master cylinder also supplies hydraulic fluid under pressure from a rear reservoir 14b through a hydraulic line 16b to an inlet port of a conventional hydraulic proportioning valve 18. The proportioning valve 18 also includes an outlet port connected to an output line 19 which supplies hydraulic fluid to actuate a pair of vehicle rear wheel brakes 20a and 20b.

Figure 2:
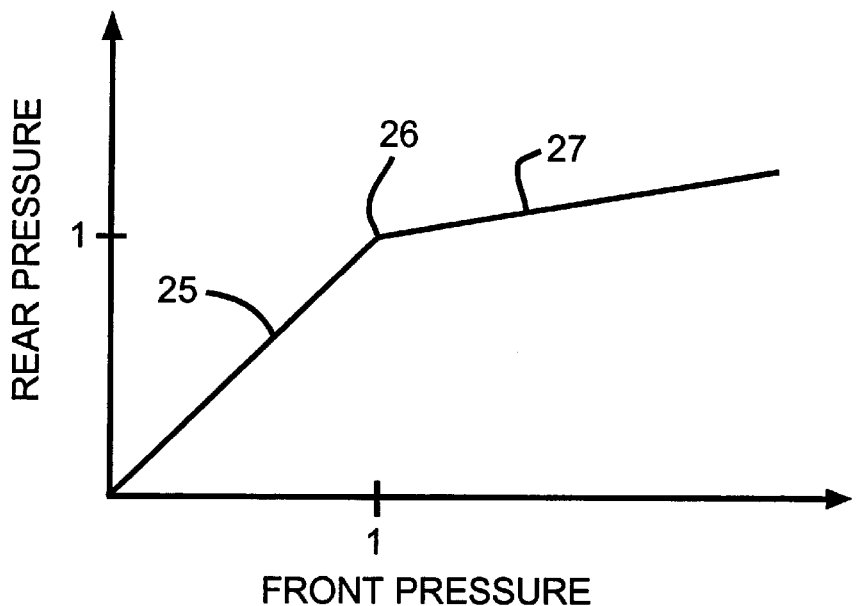
FIG. 2 is a pressure profile for the brake system shown in FIG. 1.

A pressure profile curve for the proportioning valve 18 is shown in FIG. 2, with the horizontal axis representing the front brake pressure and the vertical axis representing the rear brake pressure. The pressure profile curve is typical for a conventional fixed hydraulic proportioning valve. The rear pressure tracks and is equal to the front pressure in the region labeled 25 until a "knee" 26 is reached. At this point, the increase in the pressure to the rear brakes is limited by a fixed ratio of the hydraulic proportioning valve 18 to a portion of the front brake pressure increase, as shown by the region labeled 27.

The RWAL 10 shown in FIG. 1 utilizes a control valve 31 to selectively control the application of pressure to the rear wheel brakes 20a and 20b when the system is in an anti-lock braking mode. The control valve 31 includes a normally open solenoid valve 32 connected between the line 18b and a line 34 which supplies pressurized brake fluid to the controlled rear wheel brakes 20a and 20b. During an anti-lock braking cycle, the normally open valve 32 is closed to isolate the rear wheel brakes 20a and 20b from the master cylinder 14. Accordingly, the normally open valve 32 is commonly referred to as an isolation valve. The isolation valve 32 also can be selectively opened to increase the pressure at the rear wheel brakes 20a and 20b.

The control valve 31 also includes a normally closed solenoid valve 36, which is connected between the line 34 and a fluid accumulator 38. The normally closed valve 36 is commonly referred to as a dump valve. The dump valve 36 is selectively opened to reduce the pressure at the rear wheel brakes 20a and 20b by bleeding brake fluid from the rear wheel brakes to an accumulator 38. In the RWAL 10, the master cylinder 14 provides a source of pressurized hydraulic brake fluid during an anti-lock braking cycle, thus eliminating the need for a separate source of pressurized hydraulic fluid, such as a motor driven pump, which is usually included in a four wheel ABS.

Figure 4:
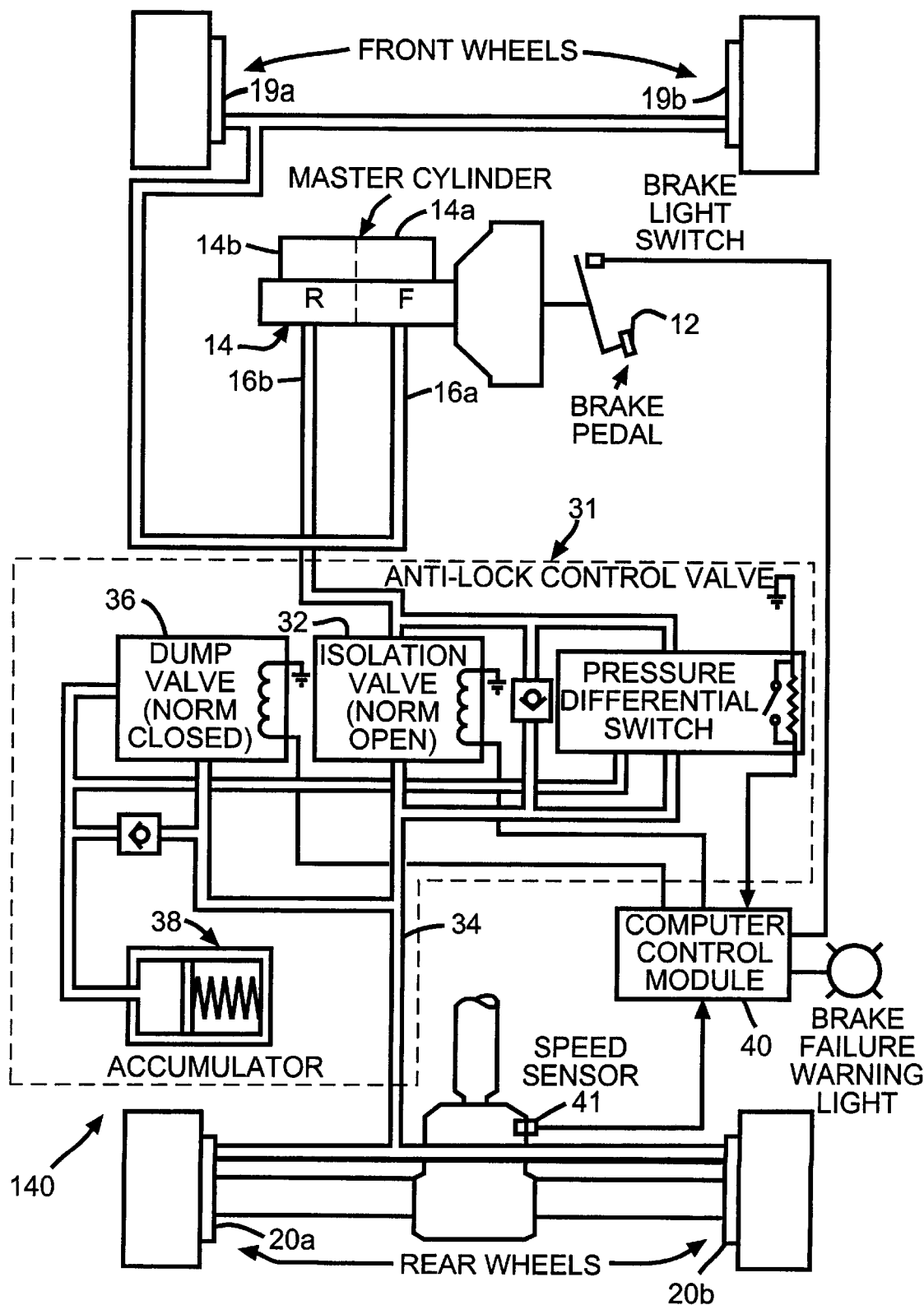
FIG. 4 is a schematic diagram of a rear wheel anti-lock brake system which includes electronic brake proportioning in accordance with the invention.

The RWAL 10 further includes a computer control module 40 which is electrically connected to a single speed sensor 41 for monitoring the rear wheel speed. As shown in FIG. 4, the speed sensor 41 is mounted upon the rear differential and monitors the average speed of the rear wheels by sensing the rotation of the differential ring gear (not shown). Alternately, the speed sensor can be mounted upon the vehicle transmission (not shown). The control module 40 can be mounted directly upon the control valve 31 or located remotely therefrom. The control module 40 includes a RWAL microprocessor (not shown) which is programmed to control the RWAL 10 in accordance with a RWAL control algorithm and parameters permanently stored in a Read Only Memory (ROM). The RWAL microprocessor also can access a Random Access Memory (RAM) for temporary storage and retrieval of data. A detailed description of the RWAL illustrated in FIG. 1 is included in U.S. Pat. Nos. 4,790,607 and 4,886,322, which are incorporated herein by reference.

During vehicle operation, the microprocessor in the RWAL control module 40 continuously receives wheel speed signals from the differential speed sensor 41. The RWAL microprocessor monitors the speed signals for potential rear wheel lock-up conditions. When the vehicle brakes are applied and the RWAL microprocessor senses a first rear wheel speed departure, which is indicative of an impending wheel lock-up condition, the RWAL microprocessor is responsive thereto to close the isolation valve 32 to isolate the rear wheel brakes 20a and 20b from the master cylinder 14. The RWAL microprocessor then selectively opens the dump valve 36 to reduce the pressure applied to the rear wheel brakes 20a and 20b and thereby correct the rear wheel speed departure. Once the wheel speed departure has been corrected and the controlled wheel has spun up to the vehicle speed, the microprocessor opens the isolation valve 32 to initiate a second wheel speed departure. Following correction of the second wheel speed departure, the rear wheel brake pressure is maintained at a constant level.

Figure 3:
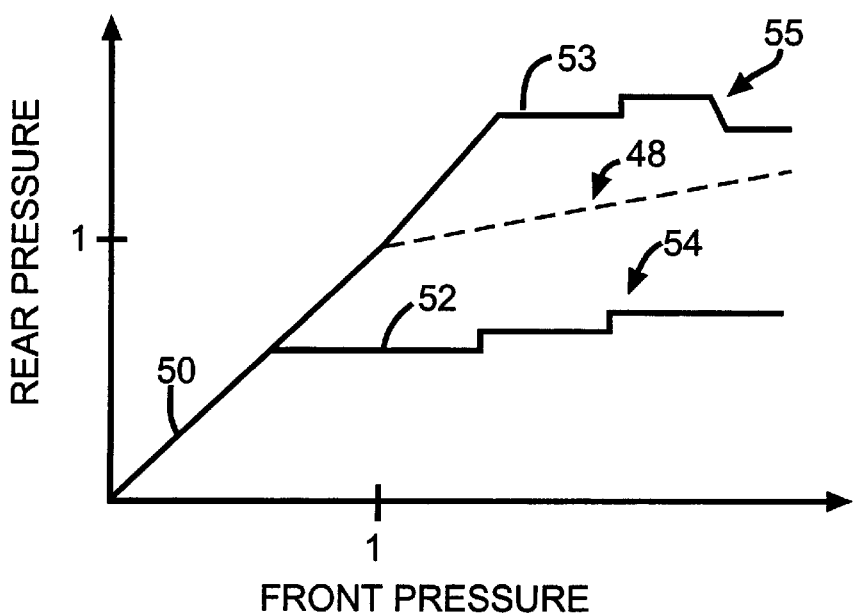
FIG. 3 is a pressure profile for a four wheel anti-lock brake system which includes electronic brake proportioning.

As described above, it is known to include electronic brake portioning in a four wheel ABS. A typical pressure profile curve for a four wheel anti-lock brake system which includes electronic brake portioning is shown in FIG. 3, with the horizontal axis again representing the front brake pressure and the vertical axis representing the rear brake pressure. The pressure profile curve from FIG. 2 for a conventional proportioning valve is included in FIG. 3 as a dashed line 48 for comparative purposes. The rear brake pressure tracks and is equal to the front brake pressure in the region labeled 50 until the rear wheel slip and vehicle characteristics are such that the optimum braking efficiency has been reached for the given stopping conditions. At this point, the rear brake pressure is maintained at a fixed level by activating the isolation valve for the rear wheel brakes, as indicated at 52 and 53. The rear brake pressure can be subsequently increased and/or decreased in accordance with varying conditions of the stop, as indicated at 54 and 55. The upper curve, which is above the conventional fixed proportioning valve curve 48, is indicative of braking a heavily loaded vehicle upon a road surface having good adhesion, while the lower curve, which is below the conventional curve 48, is indicative of hard braking during a turn. As indicated above, the four wheel ABS with electronic brake portioning is fully described in U.S. Pat. No. 5,632,535, which is incorporated herein by reference.

The present invention contemplates integrating the brake portioning function into the RWAL and thereby eliminating the proportioning valve 18. A schematic diagram for a RWAL in accordance with present invention is shown generally at 60 in FIG. 4. Components in FIG. 4 which are similar to components shown in FIG. 1 are identified by the same numerical designators. As shown in FIG. 4, the proportioning valve 18 has been removed from the vehicle brake system. The remaining components control the pressure applied to the rear wheel brakes 20a and 20b in accordance with a revised RWAL control algorithm which includes electronic brake proportioning. The revised RWAL control algorithm uses the rear wheel speed signal received from the differential speed sensor 41 to estimate the vehicle deceleration. The microprocessor in the control module 40 is responsive to the estimated vehicle deceleration to actuate the isolation valve 32 and thereby proportion the rear wheel brake forces to the front wheel brake forces.

Figure 5:
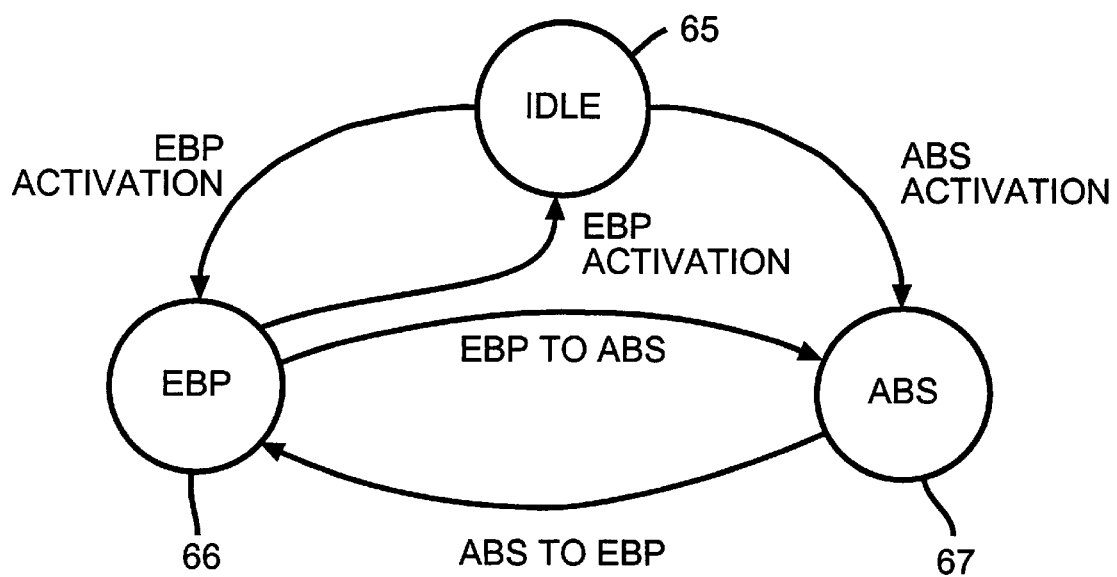
FIG. 5 is a state transition diagram for the electronic brake proportioning included in the rear wheel anti-lock brake system shown in FIG. 4.

In the preferred embodiment, the control module 40 has three control states which are illustrated in FIG. 5. The states are: (1) IDLE (no activity) indicated at 65; (2) Electronic Brake Proportioning (EBP) control indicated at 66; and (3) ABS control indicated at 67. The control module 40 transitions between the EBP and ABS states as shown by the arrows in FIG. 5. In the IDLE state, the microprocessor in the control module 40 is actively processing information and performing calculations, but not control actions are being preformed. In the ABS state, the rear brake pressure is being automatically controlled by the RWAL. In the EBP state, the microprocessor is operable to cause the RWAL valves to hold or apply pressure.

As shown in FIG. 5, a number of state transitions are possible. During vehicle deceleration, various control parameters are monitored and, if conditions warrant, the control module 40 can transition from the IDLE state 65 to the EBP state 66. A transition from the IDLE state 65 to the ABS state 67 is typically caused by an aggressive or panic brake application. A transition from the EBP state 66 to the ABS state 67 occurs if at least one rear wheel has become unstable as indicated by excessive slip and wheel deceleration. After wheel recovery, if no additional wheel instability occurs, the system transitions back to the EBP state 66. In all cases, the system transitions into the EBP state 66 from the ABS state 67. A transition from the EBP state 66 to the IDLE state 65 occurs if the conditions no longer warrant the automatic control of the rear brake pressure for front to rear proportioning. This can be either due to low speed or a reduction of brake pressure as the brake pedal 12 is released.

Figure 6:
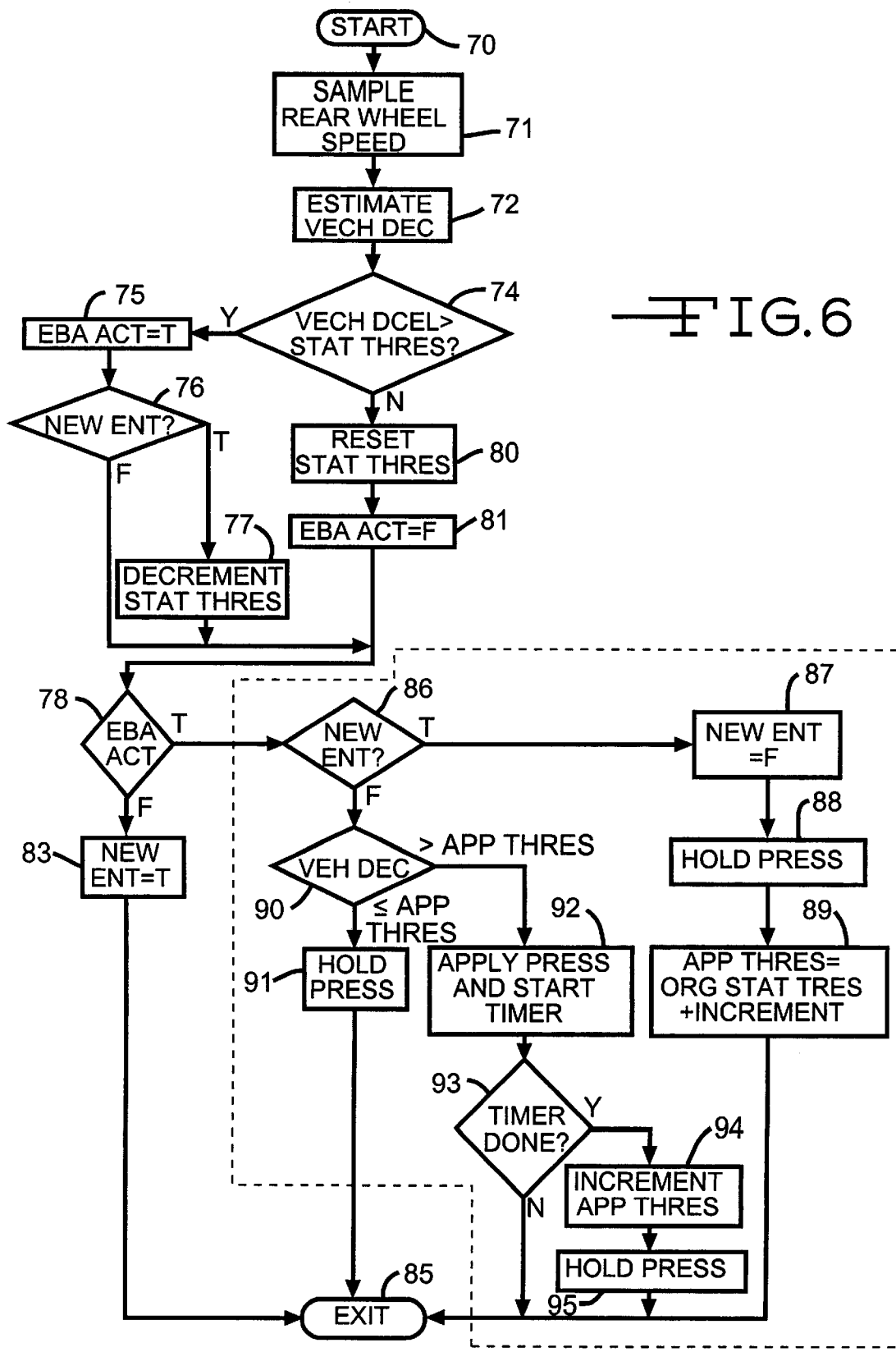
FIG. 6 is a flow chart illustrating an algorithm for the operation of the rear wheel anti-lock brake system shown in FIG. 4.

The EBP portion of the revised RWAL control algorithm is illustrated by the flow chart shown in FIG. 6. In the preferred embodiment, the EBP algorithm is a subroutine of the RWAL control algorithm. Accordingly, the EBP subroutine is called during each iteration of the RWAL control algorithm. As described above, during a braking cycle, the RWAL control module 40 and RWAL control algorithm are operative to monitor the rear wheel speed for potential wheel lock up conditions. While the RWAL control module 40 monitors the rear wheel speed, the microprocessor also will be running the EBP subroutine as needed to proportion the brake pressure during a braking cycle.

The EBP subroutine is entered through START block 70 and samples the rear wheel speed in functional block 71. It will be appreciated that, while the rear wheel speed is shown as being sampled in the EBP subroutine, the sampling is included to illustrate the operation of the EBP and the actual wheel speed sampling also can occur as a portion of the main RWAL control algorithm. The current rear wheel speed is compared to the rear wheel speed from the previous iteration and the difference is divided by the iteration time period in functional block 72 to obtain a wheel deceleration. The wheel deceleration is then filtered by a third order digital filter to obtain an estimated vehicle deceleration.

In decision block 74, the estimated vehicle deceleration is compared to a predetermined static deceleration threshold. In the flow chart shown in FIG. 6 and in this discussion, absolute values are used for the estimated vehicle deceleration and the thresholds. The static deceleration threshold is the trigger value for actuating the EBP function and corresponds to the "knee" in the pressure profile curve. It is contemplated that the static deceleration threshold is determined for the specific vehicle platform.

If the estimated vehicle deceleration exceeds the static deceleration threshold, the EBP subroutine transfers to functional block 75 where an EBP ACTive flag is set TRUE. A NEW ENTry flag is then checked in decision block 76. The NEW ENTry flag controls entry into the EBP control portion of the subroutine. As will be apparent from the description below, a TRUE NEW ENTry flag corresponds to the first iteration in which the EBP function is actuated by the subroutine while a FALSE NEW ENTry flag corresponds to subsequent iterations of the EBP subroutine. If the NEW ENTry flag is TRUE, the static deceleration threshold is decremented by a small amount to introduce hysterisis into the algorithm and avoid unnecessary "hunting" during subsequent iterations. The algorithm then transfers to decision block 78, which will be described below. If the NEW ENTry flag is FALSE, the subroutine transfers directly to decision block 78.

If the estimated vehicle deceleration is less than or equal to the static deceleration threshold in decision block 74, the EBP subroutine transfers to functional block 80 where the static deceleration threshold is reset to its predetermined value. The subroutine then sets the EBA ACTive flag FALSE in functional block 81 before continuing to decision block 78.

In decision block 78, the EBA ACTive flag is checked. If the EBA ACTive flag is false, which is indicative that the static deceleration threshold has not been exceeded, the NEW ENTry flag is set to TRUE in functional block 83 and the subroutine exits to the main RWAL control algorithm through EXIT block 85.

If the EBA ACTive flag is TRUE in decision block 78, the static deceleration threshold has been exceeded and the EBP subroutine transfers to decision block 86. Upon transferring to decision block 86, the EBP control portion of the subroutine is entered. The EBP control portion of the subroutine is enclosed by a dashed line in FIG. 6. In decision block 86, the NEW ENTry flag is checked to determine if this is the first iteration for entry into the EBP portion of the subroutine. IF the NEW ENTry flag is TRUE, the subroutine transfers to functional block 87 where the NEW ENTry flag is set FALSE. Then the isolation valve 32 is closed in functional block 88 to hold the rear brake pressure at a constant value. In functional block 89, an APPly threshold is set by incrementing the original static threshold by a predetermined amount. The original static threshold is the value of the static threshold before being decremented in functional block 77. In the preferred embodiment, the original static threshold is obtained from a look up table. Alternately, a predetermined APPly threshold can be included in the subroutine and functional block 89 omitted. The subroutine then returns to the main RWAL algorithm through EXIT block 85.

If the NEW ENTry flag is FALSE in decision block 86, the subroutine transfers to decision block 90 where the estimated vehicle deceleration is compared to the APPly threshold. If the estimated vehicle deceleration is less than or equal to the APPly threshold, the subroutine maintains the isolation valve 32 in a closed position to hold the rear brake pressure constant, as shown in functional block 91. The subroutine then returns to the main RWAL algorithm through EXIT block 85.

If the estimated vehicle deceleration is greater than the APPly threshold in decision block 90, the subroutine transfers to functional block 92 where the isolation valve 32 is opened to increase the pressure to the rear wheel brakes 20*a* and 20*b*. Additionally, a timer is started in functional block 92 if the iteration is the first iteration in which the APPly threshold is exceeded. In decision block 93, the timer is compared to a predetermined time period. If the timer is not done, the subroutine returns to the main RWAL algorithm through EXIT block 85. If the timer is done, the APPly threshold is again incremented by a predetermined amount in functional block 94 and the isolation valve 32 re-closed in functional block 95 to hold the pressure to the rear wheel brakes 20*a* and 20*b* constant. The subroutine then returns to the main RWAL algorithm through EXIT block 85.

It will be appreciated that the flow chart shown in FIG. 6 is intended to be exemplary and that the invention also can be practiced with other algorithms than the one illustrated by the flow chart.

Figure 7:
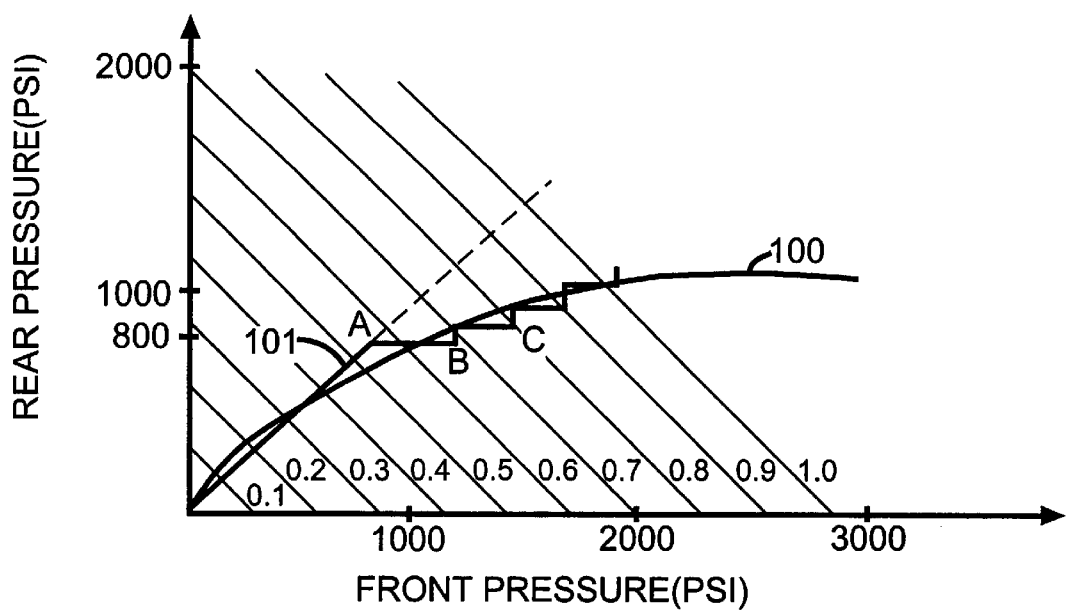
FIG. 7 is a pressure profile of the rear wheel anti-lock brake system shown in FIG. 4 for an unladen vehicle.
Figure 8:
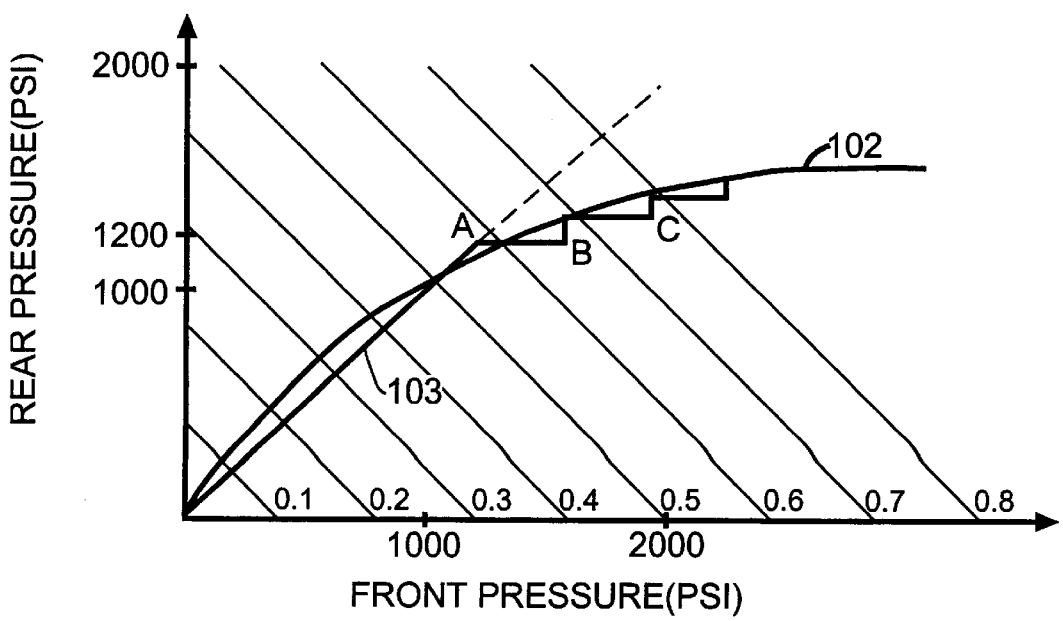
FIG. 8 is a pressure profile of the rear wheel anti-lock brake system shown in FIG. 4 for a laden vehicle.

Pressure profile curves for the RWAL electronic brake portioning algorithm described above are illustrated in FIGS. 7 and 8. The pressure profile curves assume vehicles with typical mass properties and brake system design parameters. FIG. 7 shows the proposed electronic brake portioning control solution for an unladen vehicle with an ideal (continuous) pressure distribution. Similarly, FIG. 8 shows the proposed electronic brake portioning control solution for a laden vehicle with an ideal (continuous) pressure distribution. Both figures display rear brake circuit pressure on the vertical axis and front brake circuit pressure on the horizontal axis. Also, both figures display typical vehicle deceleration contours, shown as decimal fractions of the gravitational constant, along diagonal lines oriented at 45 degrees from both major axes.

In FIG. 7, the represented unladen vehicle is assumed to be operating at some initial velocity. The ideal pressure profile curve is shown in FIG. 7 as a smooth continuous curve, which is labeled 100, while a pressure profile curve for the electronic pressure portioning is shown as a stair-step curve, which is labeled 101. It is noted that the stair-step curve 101 closely approximates the ideal pressure profile curve 100. Application of the brake pedal 12 initially yields an even pressure distribution between front and rear brake circuits. As brake pressure rises in both circuits from 0 psi to approximately 800 psi (shown at point A), the vehicle develops a deceleration of approximately 0.55 g. At this deceleration level, the rear wheels utilize a greater portion of the available surface friction than do the front wheels. Since this condition may lead to directional instability, the electronic brake portioning system uses the value as the static deceleration threshold to close the isolation valve 32 and hold the pressure in the rear brake circuit at a constant value while the front brake pressure continues to increase. The electronic brake portioning system distributes further brake pressure increases in open-loop, stepwise fashion by increments of 0.1 g as higher deceleration thresholds (see points B at 0.65 g and C at 0.75 g) are reached.

In FIG. 8, the represented laden vehicle is also assumed to be operating at some initial velocity. The ideal pressure profile curve is again shown as a smooth continuous curve in FIG. 8, which is labeled 102, while a pressure profile curve for the electronic pressure portioning response is shown as a stair-step curve, which is labeled 103. Application of the brake pedal similarly yields an initial even pressure distribution between front and rear brake circuits. Because the laden vehicle weighs more than the unladen one, a greater braking effort is required to obtain the same deceleration as the unladen vehicle. Accordingly, as brake pressure rises in both circuits from 0 psi to approximately 1200 psi (shown at point A'), the vehicle develops a deceleration of approximately 0.55 g. At this deceleration level, the rear wheels utilize a greater portion of the available surface friction than do the front wheels. Since this condition may lead to directional instability, the electronic brake portioning system uses the value as the static deceleration threshold to close the isolation valve 32 and hold the pressure in the rear circuit at a constant value while the front brake pressure continues to increase. The electronic brake portioning system distributes further brake pressure increases in open-loop, stepwise fashion by increments of 0.1 g as higher deceleration thresholds (see points B' at 0.65 g and C' at 0.75 g) are reached.

Figure 9:
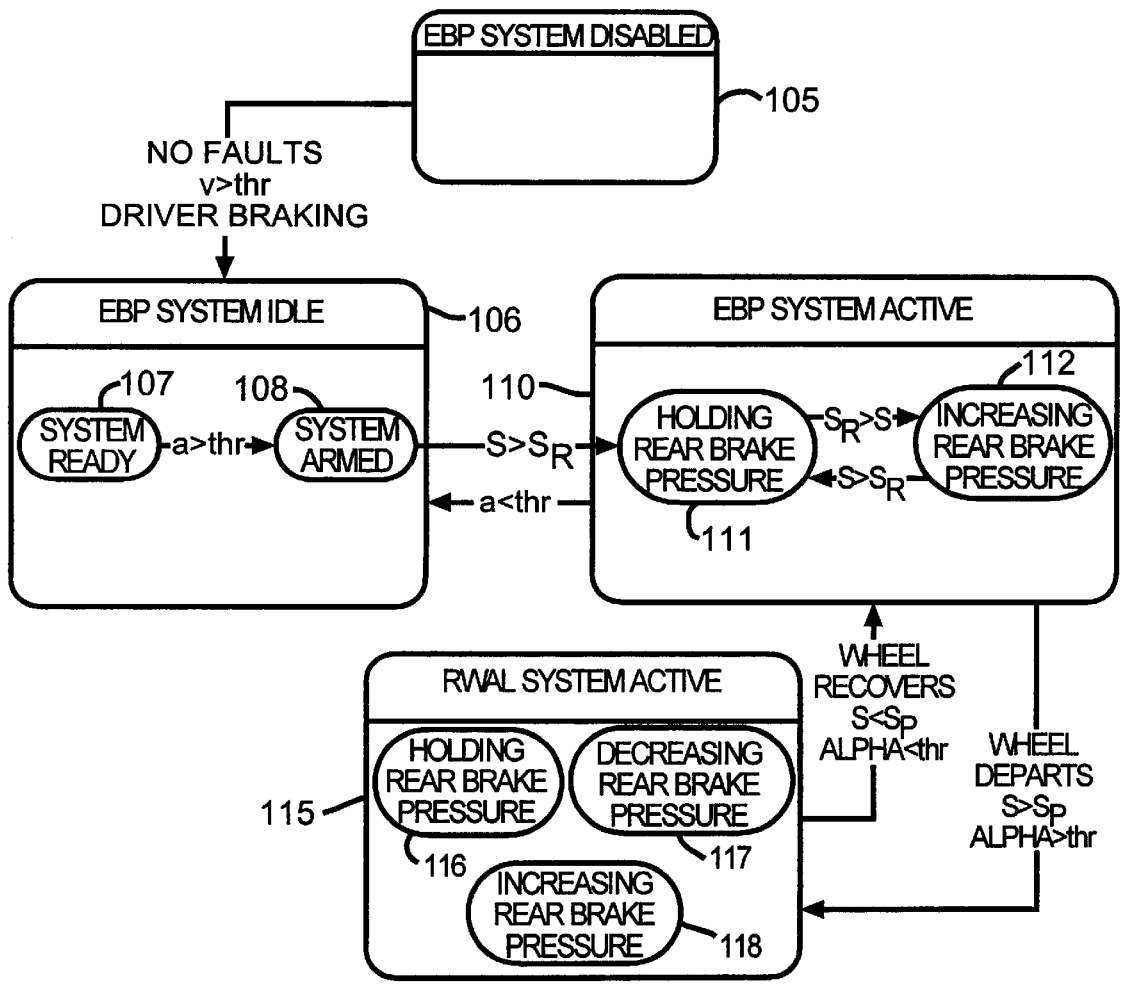
FIG. 9 is a state transition diagram for an alternate embodiment of the electronic brake proportioning system shown in FIG. 4.

The present invention also contemplates an alternate embodiment of the RWAL control algorithm which uses estimated rear wheel slip, which is the difference between the vehicle speed and the rear wheel speed, to actuate the electronic brake proportioning. Rear wheel slip also is used to actuate the RWAL. A state diagram for the alternate embodiment, which is similar to the diagram in FIG. 5, is illustrated in FIG. 9. In FIG. 9, deceleration values and comparison thresholds are assumed to be negative; however, absolute values are compared in FIG. 9 between measured quantities and the corresponding threshold. This same criteria applies to the following figures, except as noted otherwise. FIG. 9 includes an EBP "System Disabled" State shown by the block labeled 105. The EBP is in the system disabled state 105 when the vehicle speed is below a predetermined threshold, a fault in the RWAL has been detected, or the brakes are not applied. Conversely, the EBP transfers to a "System Idle" state, as illustrated by the block labeled 106, when there are no faults, the vehicle speed is greater than the predetermined threshold and the vehicle operator is applying the vehicle brakes. Upon entering the Idle state, the EBP is in a "Ready" mode of operation, which is shown by a first sub-block labeled 107. However, if the vehicle deceleration exceeds a static threshold, which can be the same predetermined value described above, the mode changes to "System Armed", as shown by a second sub-block labeled 108. Alternately, the "System Ready" sub-block 107 can be omitted, in which case the system transitions directly to the "System Armed" mode when there are no faults, the vehicle speed is greater than the predetermined threshold, the vehicle operator is applying the vehicle brakes, and the vehicle deceleration exceeds the static threshold.

If, while the vehicle deceleration is greater than the static deceleration threshold, the rear wheel slip, s, exceeds a predetermined reference slip, $S_R$, the EBP system transitions to an "Active" state which is shown in block 110. Upon entering the active state 110, the isolation valve 32 is closed, as indicated in sub-block 111, to hold the brake pressure applied to the rear wheel brakes 20a and 20b at a constant level. If, while in the active state 110, the rear wheel slip, s, falls below the reference slip, $S_R$, the isolation valve 32 is reopened, as shown in sub-block 112, to increase the rear brake pressure. The isolation valve 32 can be opened with either a discrete command or with a pulse width modulated command string. Should the rear wheel slip, s, again exceed the reference slip, $S_R$, the system returns to sub-block 111 and the isolation valve 32 is again closed. As long as the vehicle deceleration, a, remains above the static deceleration threshold, the EBP system will remain in the EBP System Active state 110 and transition between sub-blocks 111 and 112 to hold or increase the pressure applied to the rear wheel brakes 20a and 20b. If the vehicle deceleration, a, falls below the static deceleration threshold, the EBP system reverts to the system Idle state 106 with the isolation valve 32 opened to discontinue the rear brake proportioning function.

An alternate embodiment of the invention calculates an error, e, which is defined as:

$$e = s_R - s.$$

The error, e, is used to transition between sub-blocks 111 and 112 with the isolation valve 32 being closed when the error, e, is negative, and the isolation valve 32 being opened when the error, e, is positive. In the preferred embodiment, the error, e, is compared to a threshold with the isolation valve 32 being closed when the error, e, is less than a negative threshold, and the isolation valve 32 being opened when the error, e, is greater than a positive threshold. The use of thresholds, which may have either the same or different magnitudes, introduces hysterisis to avoid potential "chattering" of the isolation valve 32.

The EBP system also can transition from the Active state 110 to a "RWAL System Active" state which is illustrated by the block labeled 115 in FIG. 9. The transition to RWAL active state 115 is triggered by the rear wheel slip, s, exceeding a RWAL slip threshold, $s_p$, and the rear wheel deceleration, a, exceeding a wheel deceleration threshold, which are indicative of a potential wheel lock-up. Similarly, if the wheel speed recovers, the rear wheel slip, s, will fall below RWAL slip threshold $s_p$, and the rear wheel deceleration will fall below the rear wheel deceleration threshold, $\alpha$, and the EBP system will revert to the EBP active state 110. Similar to the state diagram shown in FIG. 5, the system returns from the RWAL active state 115 to the Idle state 106 through the EBP active state 110. While the system is in the RWAL active state 115, the isolation and dump valves 32 and 36 are selectively operated to hold, decrease, or increase pressure applied to the rear wheel brakes, 20a and 20b, as shown by the sub-blocks labeled 116, 117 and 118, respectively.

Figure 10:
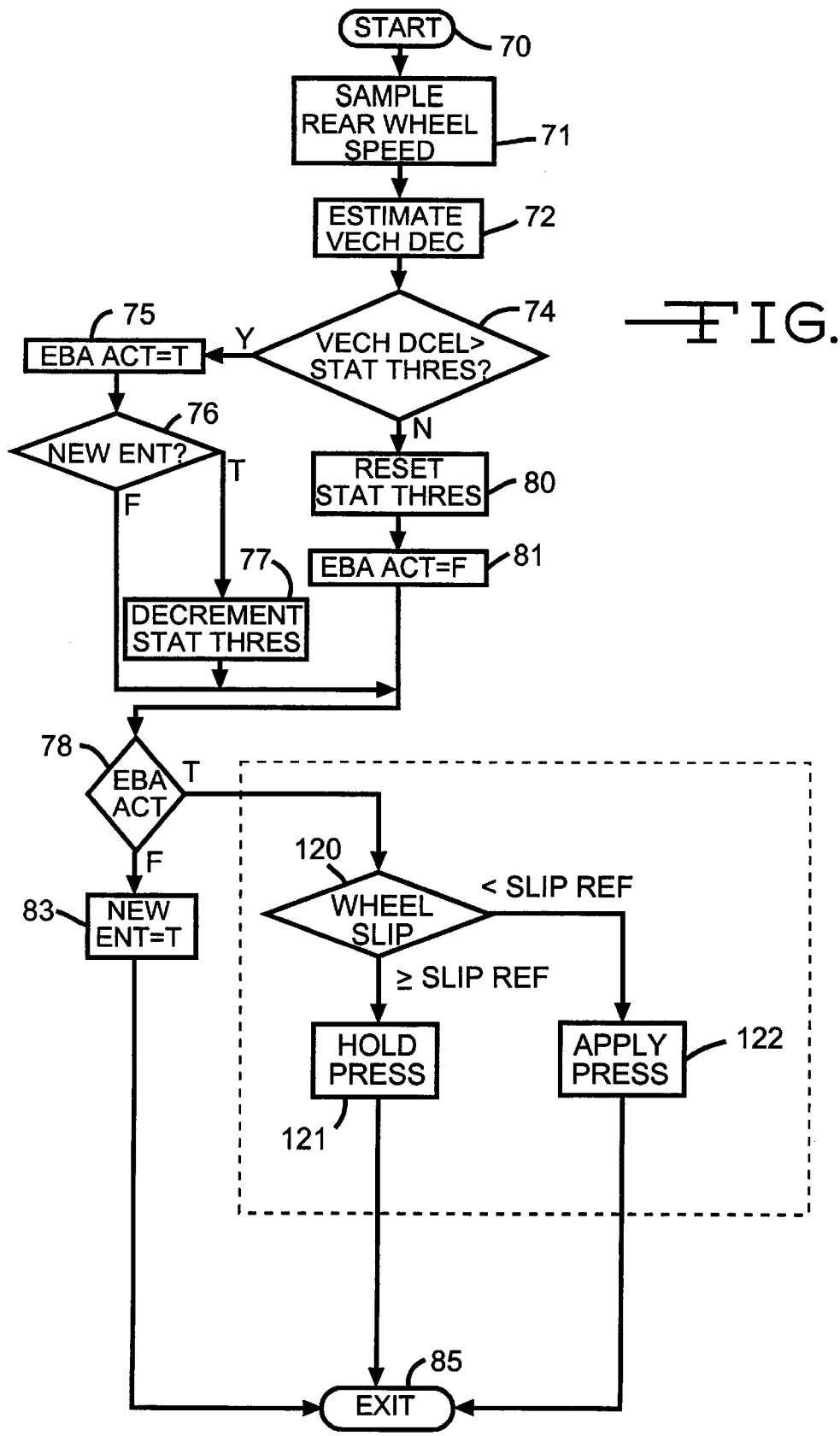
FIG. 10 is a flow chart illustrating an algorithm for the operation of the alternate embodiment of electronic brake proportioning system shown in FIG. 9.

A flow chart illustrating a subroutine for the operation of the EBP system is shown in FIG. 10. The portion outside of the dashed line is the same as shown in FIG. 6 and the blocks have the same numerical designators. Once the vehicle deceleration exceeds the static deceleration threshold in decision block 74, the subroutine sets the EBA ACTive flag TRUE and transfers to decision block 120 where the rear wheel slip is compared to the reference slip, $S_r$. If the rear wheel slip is greater than or equal to the reference slip, $s_R$, the subroutine transfers to functional block 121 where the isolation valve 32 is closed to hold the rear wheel pressure constant. The subroutine then exits to the main control algorithm through block 85. If the rear wheel slip is less than the reference slip, $S_R$, the subroutine transfers to functional block 122 where the isolation valve 32 is reopened to increase the rear wheel pressure. The subroutine then exits to the main control algorithm through block 85.

As shown in FIG. 10, the isolation valve 32 remains open during successive iterations through the subroutine until the rear wheel slip, s, increases to or above the slip reference, $S_R$, at which point the subroutine returns to functional block 121 and causes the isolation valve 32 to be re-closed. While the subroutine has been described as opening the isolation valve 32 and holding the valve open, the actuation may be implemented with a pulse wave modulated signal which cyclically opens and closes the valve 32 to raise the rear brake pressure.

The present invention also contemplates an alternate embodiment of the subroutine shown in FIG. 10 (not shown) in which an error, e, is calculated as the difference between the reference slip and the actual slip, as described above. The error, e, is compared to either zero or positive and negative thresholds in decision block 120 to control the operation of the isolation valve 32.

It will be appreciated that the flow chart shown in FIG. 10 is intended to be exemplary and that the invention also can be practiced with other algorithms than the one illustrated by the flow chart.

Figure 11:
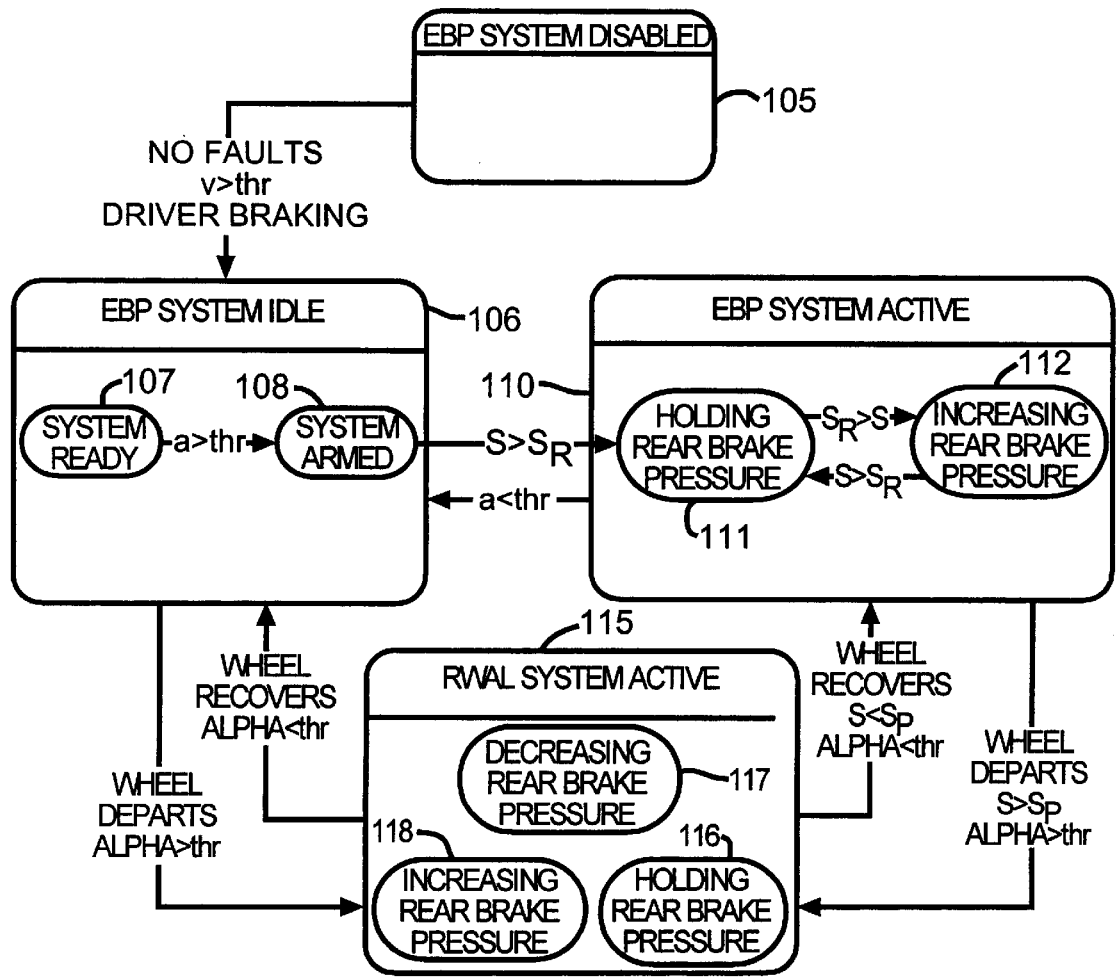
FIG. 11 is a state transition diagram for another alternate embodiment of the electronic brake proportioning system shown in FIG. 4.

The invention further contemplates an alternate embodiment of the state transition diagram which is shown in FIG. 11 where components which are similar to components shown in FIG. 9 have the same numerical designators. As shown in FIG. 11, the system can transition directly between the EBP System Idle state 106 to the REWAL System Active state 115. The transition is determined by comparing the rear wheel angular deceleration to an wheel deceleration threshold. If the angular deceleration is greater than the deceleration threshold, which is indicative of a rear wheel speed departure, the system transitions from the EBP System Idle state 106 to the RWAL Active state 115. If the angular deceleration is less than the deceleration threshold, which is indicative of a rear wheel speed recovery, the system transitions from the RWAL Active state 115 back to the EBP System Idle state 106.

Figure 12:
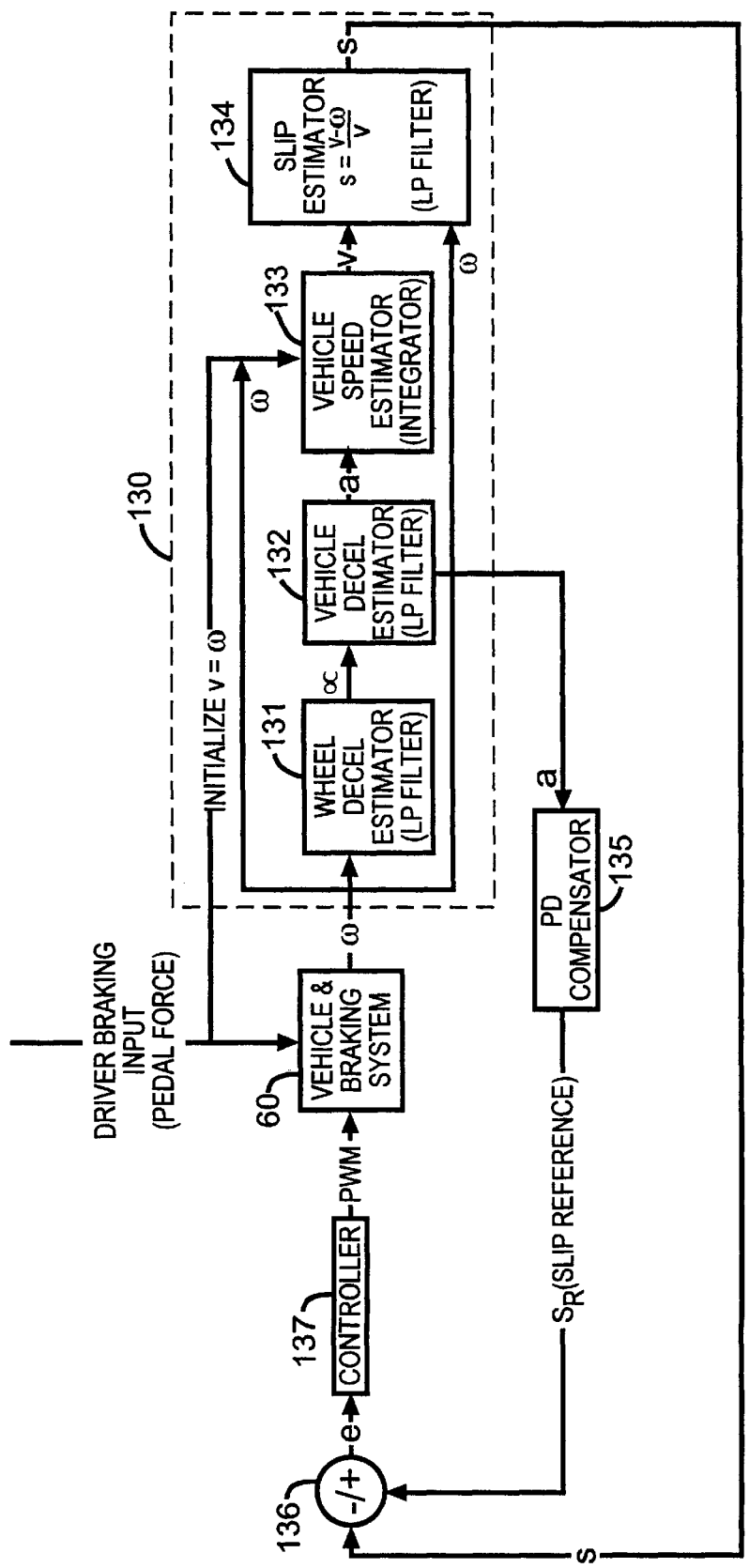
FIG. 12 is a block diagram illustrating estimation of the rear wheel slip as used with the alternate embodiments shown in FIGS. 9 and 11.

A block diagram illustrating the combined EBP and RWAL system is shown in FIG. 12. The vehicle brake system illustrated in FIG. 4 is indicated in the block labeled 60. As shown in the diagram, a sample of the rear wheel speed, $\omega$, from the differential speed sensor 41 is supplied to a slip estimator 130. The slip estimator 130 includes a wheel deceleration estimator in bock 131, where the rear wheel speed, $\omega$, is differentiated to provide a rear wheel deceleration, $\alpha$. In the preferred embodiment, the deceleration $\alpha$ is determined by dividing the difference between the current rear wheel speed and the rear wheel speed from the previous iteration by the iteration period. The resulting wheel deceleration $\alpha$ is passed through a vehicle deceleration estimator 132 to obtain a vehicle deceleration, a. In the preferred embodiment, the vehicle deceleration estimator 132 is a low pass filter having a one hertz cutoff frequency; however, it will be appreciated that the invention also can be practiced using other cutoff frequencies, such as, for example, 0.9 or 1.1. The vehicle deceleration, a, is then integrated in a vehicle speed estimator block 133 to obtain a current vehicle velocity, v. The difference between the current vehicle velocity v and the current rear wheel speed, $\omega$, is divided by the vehicle velocity v to obtain an estimated wheel slip, s, in block 134.

In the preferred embodiment, the vehicle speed estimator 133 is actuated at the beginning of a brake cycle, as illustrated by the input arrow pointing to the top of the integrator block 133. The initiation signal is generated by a change in a vehicle parameter, such as, for example, closing of the brake light switch when the brake pedal 12 is depressed, an increase in brake fluid pressure, or a decrease in vehicle wheel speed. Also, the rear wheel speed, $\omega$, is used as the initial vehicle speed for initialization of the vehicle speed estimator 133, as shown by the arrow in FIG. 11 which connects block 60 to block 133. Additionally, the wheel deceleration, vehicle deceleration and slip estimators, 131, 132 and 133, respectively, can include band pass and/or heuristic filters to improve signal accuracy; however, inclusion of such filters is optional.

The present invention further contemplates utilizing the estimated slip, s, to determine a control input signal to the brake system 60. As shown in FIG. 12, the vehicle deceleration, a, is scaled by a Proportional plus Derivative (P.D.) compensator 135 to generate a reference slip signal $s_R$. In the preferred embodiment, an amplifier having a scaling factor, $k_p$, of 0.1 is used for the P.D. compensator 135; however, it will be appreciated that other scaling factors also can be used. The estimated slip, s, is subtracted from the reference slip signal, $s_R$, which in the preferred embodiment is 0.1a, at a summing point 136 to generate an error signal, e. The error signal, e, is supplied to a controller in block 137 which is responsive thereto to generate a Pulse Width Modulated (PWM) output signal. The controller 137 can also include lead and/or lag compensation to further operate upon the error signal, e, before generation of the PWM output signal; however, this additional compensation of the error signal, e, is optional. The PWM output signal is applied to the isolation and dump valves 32 and 36 in the brake system 60 to modulate the pressure applied to the rear wheel brakes 20a and 20b. The brake system 60 also receives a pressure input from the master cylinder 14.

Figure 13:
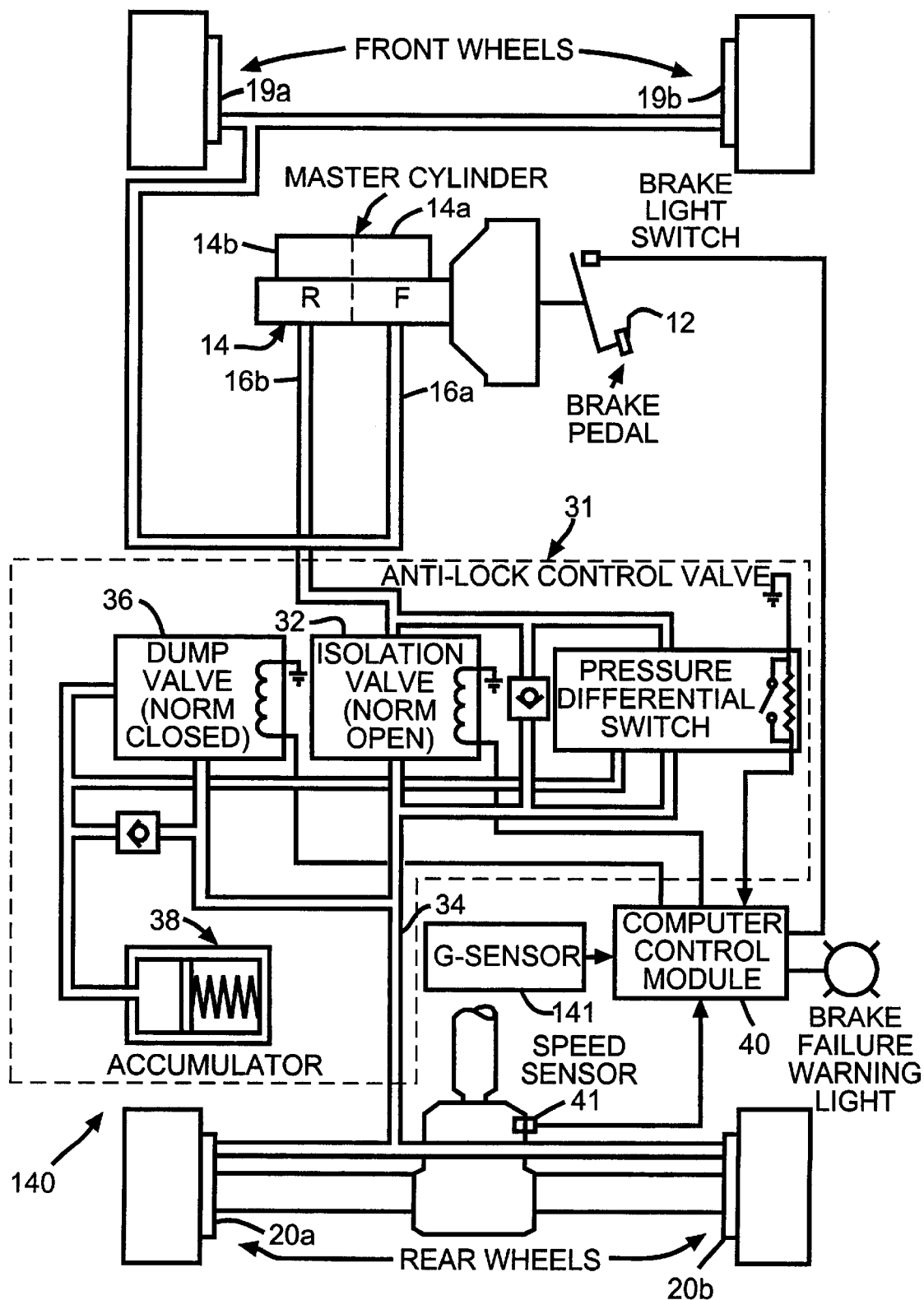
FIG. 13 is an alternate embodiment of the rear wheel anti-lock brake system shown in FIG. 4 which includes a g-sensor.

An alternate embodiment of the brake system is shown at 140 in FIG. 13. Components shown in FIG. 13 which are similar to components shown in FIG. 4 have the same numerical designators. The brake system 140 includes a conventional g-sensor 141 such as a metal beam capacitive acceleration sensor. Capacitive acceleration sensors measure the change in capacitance between two capacitor plates where the physical separation of the plates changes in response to applied acceleration or deceleration. One plate is formed as a metal beam which combines a spring element and a seismic mass of an accelerometer into one flexible structure. The metal beam is bonded over a rugged ceramic substrate. A thin film disposed upon the substrate forms the second capacitor plate. The metal beam deflects in direct proportion to applied acceleration or deceleration, changing the capacitor plate spacing and hence the capacitance of the sensor. A signal conditioning circuit converts the change in capacitance to a change in output voltage. Thus, the g-sensor generates an output signal which is proportional to the deceleration of the vehicle. The deceleration output signal is applied to the computer control module 40. While a capacitive g-sensor has been described above, it will also be appreciated that the invention can be practiced with other types of g-sensors, such as, for example, piezoelectric, capacitive micromachined silicon, piezoresistive micromachined silicon, ceramic strain or Hall effect devices.

Figure 14:
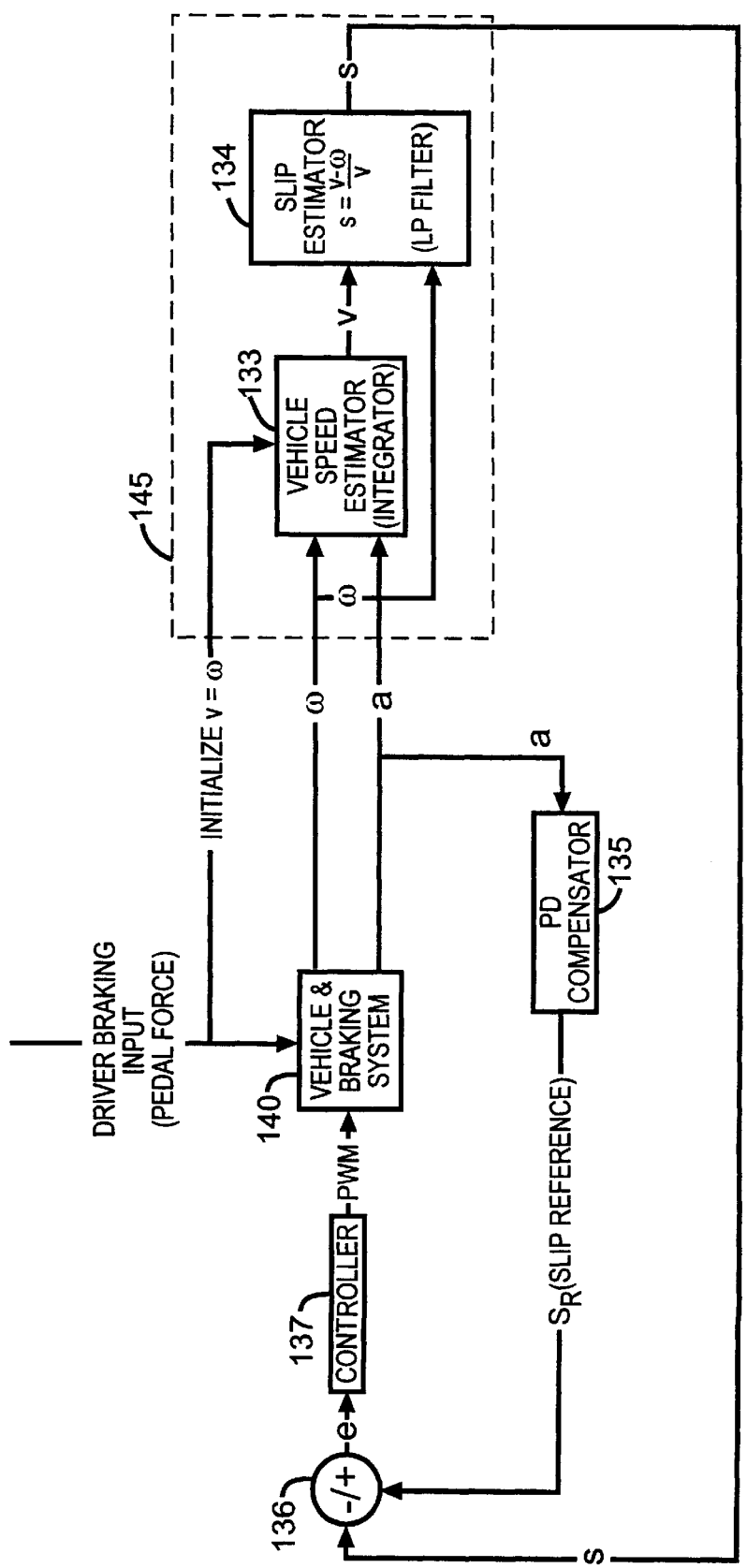
FIG. 14 is a block diagram illustrating estimation of rear wheel slip for the brake system shown in FIG. 13.

An alternate method for estimating rear wheel slip is illustrated at 145 in FIG. 14 which corresponds to the brake system 140 shown in FIG. 13. Components shown in FIG. 14 which are similar to components shown in FIG. 12 have the same numerical designators. As shown in FIG. 14, the vehicle deceleration, a, which is measured by the g-sensor 141, is supplied directly to the integrator block 133 to obtain the vehicle velocity v. As before, the difference between the rear wheel speed, ω, and the vehicle speed, v, is divided by the vehicle speed, v, in block 134 to compute the estimated rear wheel slip, s.

The embodiments illustrated in FIGS. 9 through 14 are utilized to further enhance the electronic brake proportioning under certain operating conditions, such as, for example, transitions between road surfaces having different mu values, fast brake apply rates and operation of the vehicle upon bumpy roads.

While the preferred embodiments of the invention have been illustrated and described as including a single differential speed sensor for monitoring the rear wheel speed or a single differential speed sensor and a g-sensor, it will be appreciated that the invention also can be practiced with two rear wheel speed sensors associated with each of the rear wheels (not shown) or a transmission speed sensor (not shown).

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A system for controlling a rear wheel brake of a vehicle, the system comprising:
   a master cylinder operable by a vehicle operator to supply pressurized brake fluid;
   at least one front wheel brake connected to said master cylinder;
   a normally open isolation valve having an inlet port and an outlet port, said inlet port connected to said master cylinder;
   at least one rear wheel brake connected to said isolation valve outlet port;
   a speed sensor which generates a signal proportional to the speed of the rear wheel associated with said rear wheel brake; and
   a controller connected to said speed sensor and said isolation valve, said controller being responsive to said wheel speed sensor signals to calculate an estimated vehicle deceleration and, upon said estimated vehicle deceleration exceeding a predetermined first deceleration threshold during a braking cycle, being operable to close said isolation valve to block further increases of the pressure applied to said rear wheel brake, said controller being further operable, subsequent to said closure of said isolation valve, to continue to calculate said estimated vehicle deceleration and, upon said estimated vehicle deceleration exceeding a second vehicle deceleration threshold which is greater than said first vehicle deceleration threshold, said controller is operable to selectively open said isolation valve to allow an increase of the pressure applied to said rear wheel brake, whereby the braking force is proportioned between said front and rear wheel brakes.

2. A system according to claim 1 wherein said isolation valve is selectively held open for a predetermined period of time.

3. A system according to claim 2 wherein said controller calculates said second deceleration threshold by adding a predetermined increment to said first deceleration threshold.

4. A system according to claim 3 wherein said controller and isolation valve are included in a rear wheel anti-lock brake system.

5. A system according to claim 4 wherein said speed sensor is a rear differential speed sensor.

6. A system according to claim 4 wherein said wheel speed sensor is a first wheel speed sensor which is mounted adjacent to a first rear wheel and further wherein the system includes a second wheel speed sensor mounted adjacent to a second rear wheel, said second speed sensor being connected to said controller and generating a speed signal proportional to the speed of said second rear wheel, said controller being responsive to said speed signals provided by both first and second wheel speed sensors to control said isolation valve.

7. A system for controlling a rear wheel brake of a vehicle, the system comprising:
   a master cylinder operable by a vehicle operator to supply pressurized brake fluid;
   at least one front wheel brake connected to said master cylinder;
   a normally open isolation valve having an inlet port and an outlet port, said inlet port connected to said master cylinder;
   at least one rear wheel brake connected to said isolation valve outlet port;
   a speed sensor which generates a signal proportional to the speed of the rear wheel associated with said rear wheel brake; and
   a controller connected to said speed sensor and said isolation valve; said controller being responsive to said speed sensor signals to calculate an estimated rear wheel slip and, upon said estimated rear wheel slip exceeding a predetermined slip threshold during a braking cycle, being operable to close said isolation valve to block further increases of the pressure applied to said rear wheel brake, said controller being further operable, subsequent to said closure of said isolation valve, to continue to calculate said estimated rear wheel slip and, upon said estimated rear wheel slip falling below said predetermined slip threshold, said controller is operable to selectively open said isolation valve to allow an increase of the pressure applied to said rear wheel brake, whereby the braking force is proportioned between said front and rear wheel brakes.

8. A system according to claim 7 wherein said controller includes a low pass filter, said controller being responsive to said speed sensor signal to calculate a rear wheel deceleration and further wherein said rear wheel deceleration is operated upon by said low pass filter to generate an estimated vehicle deceleration, said controller being responsive to said estimated vehicle deceleration to calculate said estimated rear wheel slip.

9. A system according to claim 8 wherein said controller also includes an integrator, said integrator being responsive to said rear wheel speed and said estimated vehicle deceleration to compute a vehicle velocity, said controller being responsive to said rear wheel speed and said vehicle deceleration to calculate said estimated rear wheel slip.

10. A system for controlling a rear wheel brake of a vehicle, the system comprising:
- a master cylinder operable by a vehicle operator to supply pressurized brake fluid;
- at least one front wheel brake connected to said master cylinder;
- a normally open isolation valve having an inlet port and an outlet port, said inlet port connected to said master cylinder;
- at least one rear wheel brake connected to said isolation valve outlet port;
- a speed sensor which generates a signal proportional to the speed of the rear wheel associated with said rear wheel brake;
- a controller connected to said speed sensor and said isolation valve; and
- a g-sensor connected to said controller, said g-sensor generating a signal proportional to the longitudinal deceleration of the vehicle; said controller being responsive to said speed sensor and g-sensor signals to calculate an estimated rear wheel slip and, upon said estimated rear wheel slip exceeding a predetermined slip threshold during a braking cycle, being operable to close said isolation valve to block further increases of the pressure applied to said rear wheel brake, said controller being further operable, subsequent to said closure of said isolation valve, to continue to calculate said estimated rear wheel slip and, upon said estimated rear wheel slip falling below said predetermined slip threshold, said controller is operable to selectively open said isolation valve to allow an increase of the pressure applied to said rear wheel brake, whereby the braking force is proportioned between said front and rear wheel brakes.

11. A brake pressure control method for a vehicle having a front wheel brake and rear wheel brake, the front and rear wheel brakes connected to and actuated by a master cylinder, the method comprising the steps of:
(a) providing a system for controlling at least one rear wheel brake, the system including an isolation valve connected between the master cylinder and the controlled rear wheel brake;
(b) sampling the rear wheel speed;
(c) using the sampled rear wheel speed to estimate a vehicle deceleration;
(d) comparing the estimated vehicle deceleration to a predetermined first deceleration threshold;
(e) closing the isolation valve during a braking cycle when the estimated deceleration is greater than the first deceleration threshold;
(f) continuing to sample the rear wheel speed;
(g) using the sampled rear wheel speed to update the estimated vehicle deceleration;
(h) comparing the updated estimated vehicle deceleration to a second deceleration threshold which is greater that the first deceleration threshold; and
(i) selectively opening the isolation valve upon the updated estimated vehicle deceleration exceeding the second deceleration threshold to increase the pressure applied to the controlled rear wheel brake, whereby the braking force is proportioned between said front and rear wheel brakes.

12. The control method according to claim 11 wherein step (i) includes holding the isolation valve open for a predetermined time period.

13. The control method according to claim 12 wherein, subsequent to closing the isolation valve in step (e), the second deceleration threshold is calculated by adding a predetermined increment to said first deceleration threshold.

14. A system for controlling the rear wheel brakes of a vehicle, the system comprising:
- a master cylinder operable by a vehicle operator to supply pressurized brake fluid;
- at least one front wheel brake connected to said master cylinder;
- a normally open isolation valve having an inlet port and an outlet port, said inlet port connected to said master cylinder;
- at least one rear wheel brake connected to said isolation valve outlet port;
- a speed sensor which generates a signal proportional to the speed of the rear wheel associated with said rear wheel brake; and
- a controller connected to said speed sensor and said isolation valve; said controller being responsive to the vehicle speed exceeding a vehicle speed threshold and the vehicle brakes being applied to enter a system ready state, said controller being further operative upon the vehicle deceleration exceeding a vehicle deceleration threshold to transition to a system armed state, said controller also calculating a slip for the controlled rear wheel and, upon said slip exceeding a first slip threshold while in said system armed state, transitioning to an electronic brake proportioning state in which said controller closes said isolation valve when said slip is greater than said first slip threshold and opens said isolation valve when said slip is less than said first slip threshold, whereby the braking force is proportioned between said front and rear wheel brakes.

15. A system according to claim 14 wherein said system also includes a dump valve connected to said controlled rear wheel brake and said controller also computes an angular deceleration for said controlled rear wheel and further wherein said controller is operative while in said system ready state and upon said wheel deceleration exceeding a wheel deceleration threshold to transition to a rear wheel anti-lock brake control state during which said controller selectively operates said isolation and dump valves to prevent a lock up of said controlled rear wheel brake.

16. A system according to claim 15 wherein said controller transitions from said rear wheel anti-lock control state to said electronic brake proportioning state upon said controlled rear wheel deceleration falling below said wheel deceleration threshold and said controlled rear wheel slip falling below a second slip threshold.

17. A system for controlling the rear wheel brakes of a vehicle, the system comprising:

a master cylinder operable by a vehicle operator to supply pressurized brake fluid;

at least one front wheel brake connected to said master cylinder;

a normally open isolation valve having an inlet port and an outlet port, said inlet port connected to said master cylinder;

at least one rear wheel brake connected to said isolation valve outlet port;

a speed sensor which generates a signal proportional to the speed of the rear wheel associated with said rear wheel brake; and a controller connected to said speed sensor and said isolation valve; said controller being responsive to the vehicle speed exceeding a vehicle speed threshold, the vehicle brakes being applied and the vehicle deceleration exceeding a vehicle deceleration threshold to enter a system armed state, said controller also calculating a slip for the controlled rear wheel and, upon said slip exceeding a first slip threshold while in said system armed state, entering an electronic brake proportioning state in which said controller closes said isolation valve when said slip is greater than said first slip threshold and opens said isolation valve when said slip is less than said first slip threshold, whereby the braking force is proportioned between said front and rear wheel brakes.

* * * * *